Dec. 30, 1969 C. E. GRAF 3,487,236

TIME DELAY CONTROL CIRCUIT

Filed Sept. 30, 1966 2 Sheets-Sheet 1

INVENTOR.
CARLTON E. GRAF
BY Edward W. Goebel Jr.
HIS AGENT

Dec. 30, 1969 C. E. GRAF 3,487,236

TIME DELAY CONTROL CIRCUIT

Filed Sept. 30, 1966 2 Sheets-Sheet 2

INVENTOR.
CARLTON E. GRAF
BY Edward W. Goebel, Jr.
HIS AGENT 3,487,236

TIME DELAY CONTROL CIRCUIT

Carlton E. Graf, Erie, Pa., assignor to General Electric Company, a corporation of New York Filed Sept. 30, 1966, Ser. No. 583,230
Int. Cl. H03k 5/08, 17/26, 17/28
U.S. Cl. 307—293 12 Claims

ABSTRACT OF THE DISCLOSURE

A timing capacitor and a platform voltage source are connected in series across two electrodes of a negative resistance unijunction transistor to control the timing period between successive output pulses of a time delay control circuit. The capacitor is charged at a predetermined rate to provide timing signals for driving the transistor into its negative resistance mode of operation. While the continuous platform voltage signal controls the timing period between successive output pulses, this signal is prevented from charging the capacitor, thereby allowing instantaneous response to desired changes in the timing period. A second, more rapidly charged capacitor may be used as an auxiliary energy source to assure that there is sufficient current available to turn on the transistor when it is driven into its negative resistance mode of operation. In another embodiment of this invention, a unijunction transistor is fired independently of its breakdown voltage level.

The invention relates to a circuit for controlling the generation of output signals which may, for example, be used for the operation of controlled rectifiers, and more particularly relates to control circuits of this type which employ unijunction transistors to generate time delayed output signals.

Numerous control circuits are designed to generate output signals having a period which is controllable in response to a designated characteristic of a load device. A number of these circuits employ unijunction transistors. In one conventional circuit a capacitor is connected across the emitter and base one electrodes of a unijunction transistor, while the base two and base one electrodes are connected across a source of operating voltage. The capacitor is included in a pair of timing circuits, each having a different time constant. These timing circuits charge the capacitor to the breakdown voltage level of the unijunction transistor. At this time the emitter-to-base one impedance of the unijunction transistor decreases substantially, discharging the capacitor to form an output pulse.

One of the two timing circuits charges the capacitor with a voltage which increases as an exponential ramp function. This ramp function voltage reaches the breakdown voltage level of the unijunction transistor at a certain time after the preceding output pulse was generated. The second timing circuit more rapidly charges the capacitor with a pedestal voltage which forces the total voltage across the capacitor to reach the breakdown voltage level of the unijunction transistor more quickly than if the capacitor were merely charged with the ramp voltage. By increasing or decreasing the pedestal voltage level, the unijunction transistor can be fired sooner or later, respectively, after the previous pulse.

In the above-described circuit the capacitor across the emitter and base one electrodes must be charged with the ramp and pedestal voltages to the breakdown voltage level of the unijunction transistor to fire this transistor. The unijunction transistor cannot be fired instantaneously with a sudden change in load requirements or at any time after such a change until the capacitor is charged to this level.

To decrease minimum firing time with the conventional circuit described, the time constant of the pedestal timing circuit must be decreased or the voltage level of the pedestal charging voltage must be increased. Either of these modifications of the conventional circuit involves increased cost and design considerations which may make the use of such a circuit prohibitive.

It is thus an object of this invention to provide a time delay control circuit wherein the generation of output signals is not solely dependent upon the charging of capacitors.

It is another object of this invention to provide an improved time delay control circuit which can vary the timing period between successive output signals instantaneously with a change in load requirements.

As described above, the voltage developed across the capacitor varies as a function of both the ramp voltage generating timing circuit and the pedestal voltage generating timing circuit. By applying pedestal voltages of known amounts, any of a number of time delays can be established. The same capacitor is used to store both the ramp and the pedestal voltages. Once the pedestal voltage charges the capacitor during a timing cycle, the effective pedestal voltage level cannot be decreased without affecting the ramp voltage as well. Thus the conventional control circuit is insensitive during a timing cycle to commands for an increased time delay. Furthermore, since the ramp and pedestal voltages must both charge the capacitor, the conventional circuit has a limited sensitivity to increases in pedestal voltage as well.

It is thus another object of this invention to provide an improved time delay control circuit which responds instantaneously to changes in control input signal level which change the timing period between successive output signals during a timing cycle.

It is a further object of this invention to provide a time delay control circuit which can respond to decreases in the control input signal level anytime during the timing cycle.

Conventional time delay control circuits using unijunction transistors, such as the type described above, operate when a voltage applied between the emitter and base one electrodes reaches the breakdown voltage level of the unijunction transistor. That is, they generate output signals when the emitter to base one voltage reaches a certain fraction of the base two-to-base one voltage, this fraction being a characteristic often referred to as the intrinsic stand-off ratio of the unijunction transistor. However, the intrinsic stand-off ratios of different transistors of the same type may vary from transistor to transistor. A control input signal of one voltage level may provide a first time delay at a first temperature and a different time delay with each temperature change. Changes in the intrinsic stand-off ratio cause the different time delays with temperature changes, and these changes may not occur as a predictable function of the ambient temperature. The intrinsic stand-off ratio of each of a plurality of unijunction transistors of the same type may change to a different extent with any temperature change. Thus it is difficult to design a time delay control circuit where each of a plurality of unijunction transistors, subject to ambient temperature changes, must provide precisely spaced output signals.

It is still a further object of this invention to provide a semiconductor time delay control circuit wherein the time delay is unaffected by ambient temperature changes.

It is another object of this invention to provide a unijunction transistor time delay control circuit wherein the firing time of the unijunction transistor is unaffected by changes in the intrinsic stand-off ratio of the unijunction transistor.

Briefly stated, in accordance with one aspect of this invention, a time delay control circuit includes a unijunction transistor having its base one and base two electrodes connected across a source of operating voltage. Means including a first capacitor and a platform voltage source provide control signals for firing the unijunction transistor. Means are included for charging the capacitor at a predetermined rate to develop a capacitor voltage. However, the platform voltage source does not charge the capacitor. The circuit also includes means for connecting the capacitor and the platform voltage source in series with two electrodes of the unijunction transistors so that control signals, comprising the sum of the platform voltage and the capacitor voltage, cause the unijunction transistor to generate output pulses when they reach a prescribed voltage level. An auxiliary energy source may provide current which forces the unijunction transistor into its low impedance state once it is fired, regardless of the charge across the capacitor.

In one embodiment of this invention, the platform and capacitance voltages are applied across the emitter and base one electrodes of the unijunction transistor to fire the transistor when the sum of these voltages equals the breakdown voltage level of this transistor. In another embodiment of this invention, the sum of the platform and capacitance voltages is compared with a reference voltage. Means are provided for decreasing the base two-to-base one voltage level when the sum of the platform and capacitance voltages is greater than the reference voltage level, thereby firing the unijunction transistor.

The specification concludes with claims particularly pointing out and distinctly claiming the subject matter of this invention. The organization and manner of process of making and using this invention, together with objects and advantages thereof, may be best understood by reference to the following description taken in conjunction with the accompanying drawings, in which:

While this invention is not limited to any one application, and may be used wherever it is desired to generate output signals after a controllable time delay, it is particularly useful in circuits wherein the signals are used to control the conduction of controlled rectifiers. Such circuit may be, for example, direct current motor drives which are energized from alternating current sources.

Figure 1:
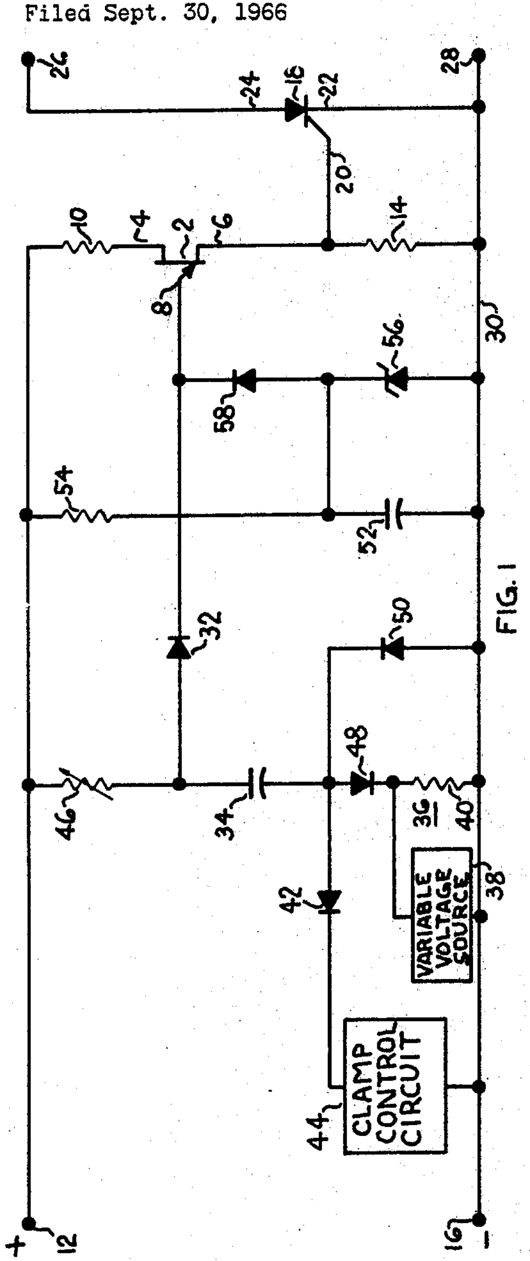
FIG. 1 is a schematic diagram showing a time delay control circuit designed in accordance with this invention.

Referring now to FIG. 1, a time delay control input circuit includes a unijunction transistor 2 having a base two electrode 4, a base one electrode 6, and an emitter electrode 8. The base two electrode 4 is coupled through a resistor 10 to a positive terminal 12 of a source of operating voltage, while the base one electrode 6 is coupled through a resistor 14 to a negative terminal 16 of this source. As explained above, the unijunction transistor 2 can be fired when the voltage across its emitter electrode 8 and its base one electrode 6 is a certain percentage, called the intrinsic stand-off ratio, of the voltage applied across the base two electrode 4 and the base one electrode 6. For example, if the intrinsic stand-off ratio of the unijunction transistor 2 is 60% and the voltage from the base two electrode 4 to the base one electrode 6 is 20 volts, when the voltage across the emitter electrode 8 and the base one electrode 6 is 12 volts the unijunction transistor 2 is fired. At this time the impedance between the emitter electrode 8 and the base one electrode 6 decreases substantially, developing an output signal across the resistor 14. In the present circuit, the output signals are coupled to a controlled rectifier 18 having its gate electrode 20 and its cathode 22 connected across the resistor 14. An anode 24 of the controlled rectifier 18 is connected to an output terminal 26, while the cathode 22 is connected to another output terminal 28 at a common line 30 for the control circuit.

Means are provided for supplying control input signals for firing the unijunction transistor and thereby forming output pulses. For this purpose, a diode 32 is connected from cathode to anode between the emitter electrode 8 and one terminal of a capacitance comprising a capacitor 34. The other terminal of the capacitor 34 is coupled through a platform voltage source 36 to the common line 30.

The platform voltage source 36 can very quickly raise the voltage level across the emitter electrode 8 and base one electrode 6 of the unijunction transistor 2. This source comprises a variable voltage source 38 which is connected across a resistor 40 in series with the capacitor 34 and the emitter and base one electrodes of the unijunction transistor 2. The variable voltage source 38 could comprise a source of direct current voltage, the magnitude of which may vary in response to some characteristic of a load device controlled by the time delayed pulses which are generated by the unijunction transistor 2. For example, the source 38 can be used in a high gain feedback loop of a regulating system where it shortens the transit time of feedback signals from a load to a control portion of the system.

Means are provided for changing the effective platform voltage in the control circuit at anytime during a timing cycle. That is, a diode 42 is coupled to a clamp control circuit 44 which can cause the diode 42 to shunt or clamp the platform voltage source out of the control circuit at any time. The clamp control circuit 44 can also unclamp the platform voltage source at any time to apply the variable voltage to the control circuit once again. The clamp control circuit may comprise a switch which can connect the cathode of diode 42 to the common line 30.

Means, including a rheostat 46 connected between the positive polarity operating voltage terminal 12 and one terminal of the capacitor 34, are provided for charging the capacitor 34. The rheostat 46 and the capacitor 34 form a part of the single, variable time delay circuit which controls the firing of the unijunction transistor 2. The operating voltage source connected across the terminals 12 and 16 charges the capacitor 34 through the rheostat 46 at an exponential rate which varies with the time constant of the time delay circuit, depending upon the effective resistance of the rheostat 46 in this circuit. The rheostat 46 may be replaced by a constant current charging circuit for the capacitor 34. Means are also provided for isolating the capacitor 34 from the platform voltage source 36 while the capacitor 34 is discharging. These means include a diode 48 connected from anode to cathode between the capacitor 34 and the resistor 40 to isolate the capacitor 34 from the variable voltage source 38. They further include a diode 50 connected from anode to cathode between one terminal of the capacitor 34 and the common line 30.

When the sum of the platform voltage and the voltage across the capacitor 34, minus the voltage drops across circuit components such as the diode 32 and the resistor 14, equals the breakdown voltage level of the unijunction transistor 2, this transistor is fired. Where the platform voltage supplied across the resistor 40 is large, the capacitor 34 may only be charged to a small extent, thereby storing only a small amount of electrical energy. This stored energy may not be enough to maintain the unijunction transistor 2 in its low impedance state long enough to generate appropriate output signals across the resistor 14. Thus, the time delay control circuit may also include an auxiliary energy source to supply energy to the unijunction transistor once it is fired. In one form, this energy source may comprise a capacitor 52 coupled through a resistor 54 across the operating voltage terminals 12 and 16. A breakdown voltage device 56, such as a Zener diode, limits the voltage level across the capacitor 52 to below the breakdown voltage level of the unijunction transistor 2. The time constant of the time delay circuit which includes the capacitor 52 and the resistor 54 is very short as compared with the range of time constants at which the time delay circuit including the capacitor 34 and the rheostat 46 operates. The time constant of the circuit which includes the capacitor 34 may be around 10 times greater than that of the circuit which includes the capacitor 52. This allows the capacitor 52 to charge much more quickly than the capacitor 34. Thus the capacitor 52 is an auxiliary energy source which is very quickly ready to discharge through the unijunction transistor 2. A diode 58 is connected from anode to cathode between the capacitor 52 and the emitter electrode 8 to discharge the capacitor 52 once the unijunction transistor 2 is fired.

The operation of the circuit shown in FIG. 1 depends upon the time it takes for the emitter to base one voltage of the unijunction transistor 2 to reach the breakdown voltage level of the unijunction transistor 2 after this transistor has returned to its high impedance state. Assuming that the platform voltage level is zero volts and that the capacitor 34 has been completely discharged the last time the unijunction transistor 2 was fired, the time delay of the control circuit is solely dependent upon the charging time of the capacitor 34. When the voltage across the capacitor 34 reaches the breakdown voltage level of the unijunction transistor 2, this transistor is fired. The platform voltage source 36 may be inserted in series with the capacitor 34. The platform voltage instantaneously raises the voltage level across the emitter electrode 8 and the base one electrode 6. Thus, it decreases the time it takes the time delay circuit including the capacitor 34 to raise the emitter-to-base one voltage to the breakdown voltage level. The time delay of the control circuit may be increased or decreased by decreasing or increasing, respectively, the platform voltage level.

Note that the platform voltage is a portion of the basic control input voltage for the control circuit. That is, the magnitude of the platform voltage level is raised and lowered to change the timing cycle by precise amounts. The platform voltage level is changed without appreciably affecting the timing capacitor voltage. One conventional circuit applies periodic pulses in series with a timing capacitor to synchronize the firing of a unijunction transistor with the beginning of a power source half cycle. However, this conventional circuit still uses two timing circuits for firing the unijunction transistor. The voltage which changes the timing cycle by precise amounts with variations in load requirements still charges a capacitor, the capacitor on which the timing voltage is developed.

One important advantage of this invention is the fact that the platform voltage level may be very quickly changed without varying the charge across the capacitor 34. For example, the voltage level across the variable voltage source 38 may be set by a characteristic of a load device which is controlled by the time delay control circuit. The controlled characteristic may change during a timing cycle, forcing a decrease in the variable voltage level and requiring a longer time delay for the control circuit. The pedestal voltage level is changed instantaneously, lengthening the time delay of the control circuit without affecting the charge across the capacitor 34. Furthermore, the clamp control circuit can shunt the platform voltage entirely from the control circuit by shunting the variable voltage source with the diode 42. Thus, the platform voltage may be completely eliminated without affecting the charge across the capacitor 34. The time delay circuit can continue to charge the capacitor 34 as if the platform voltage had never been applied to the control circuit.

Once the voltage across the emitter electrode 8 and the base one electrode 6 reaches the breakdown voltage level, the unijunction transistor 2 is fired. The capacitor 34 is discharged through a path including the diode 32, the emitter and base one electrodes of the transistor 2, the resistor 14, the common line 30, and the diode 50. As the impedance between the emitter electrode 8 and the base one electrode 6 decreases, the diode 58 is forward biased, discharging the capacititor 52 through the emitter and base one electrode as well. The discharge of the capacitors 34 and 52, along with the current flow through the rheostat 46 generates an output pulse across the resistor 14. In the present embodiment of this invention, this output pulse can turn on the controlled rectifier 18 to energize a load connected to the terminals 26 and 28.

Figure 2:
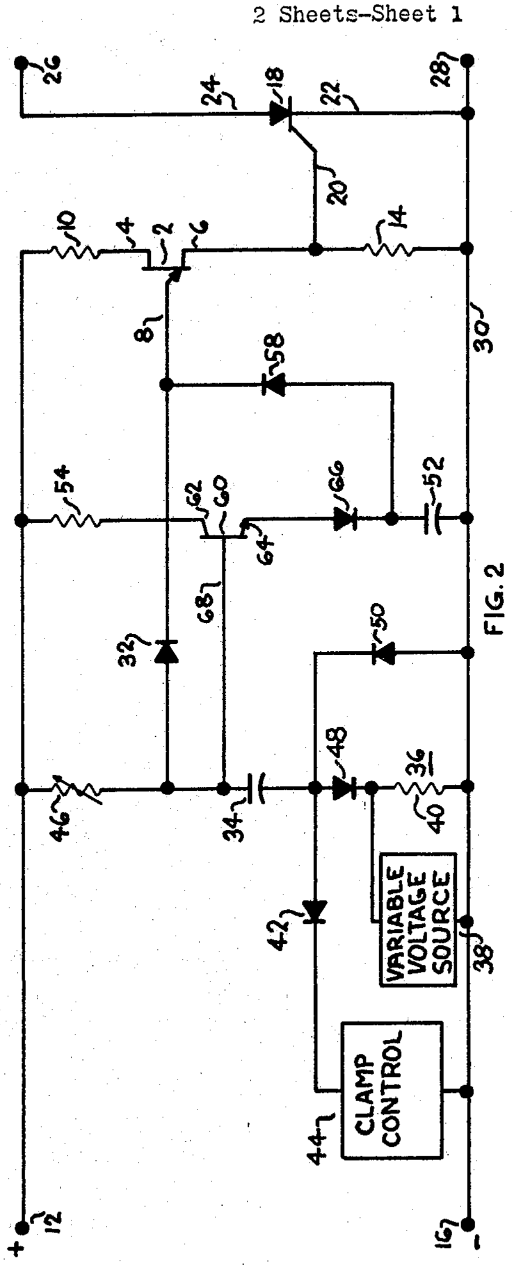
FIG. 2 is a schematic diagram showing another embodiment of this invention wherein a time delay control circuit includes an auxiliary energy storage device which can be charged to a voltage level just below that of the control input voltage.

FIG. 2 shows another embodiment of this invention wherein the auxiliary energy source can be charged to the breakdown voltage level of the unijunction transistor without initiating the firing of this transistor on its own. Circuit components in FIG. 2 which can be similar to those described with reference to FIG. 1 are marked with the same numerals given them in FIG. 1.

in FIG. 2, means are provided for charging the capacitor 52 to a voltage level approximately equal to the pedestal voltage plus the voltage across the capacitor 34. In this circuit, a transistor 60 has its electrode 62 connected to the resistor 54, while its emitter electrode 64 is connected through a diode 66 to one side of the capacitor 52. A base electrode 68 of the transistor 60 is connected between the capacitor 34 and the rheostat 46.

During the operation of the circuit shown in FIG. 2, the control input voltage, comprising the sum of the voltage across the capacitor 34 and the platform voltage, increases as the capacitor 34 is charged during each timing cycle. The transistor 60 is connected in an emitter follower configuration with the base electrode biased by the capacitor 34 and the emitter electrode biased through the anode of the diode 66. As the control input voltage increases, the transistor 60 allows the operating voltage source to charge the capacitor 52 to a voltage level equal to the sum of the platform voltage and the voltage across the capacitor 34, less the voltage drop from base to emitter of the transistor 60 and the drop across the diode 66. Again, the time delay of the circuit charging the capacitor 52 is very short as compared with that charging the capacitor 34 so that the charge across the capacitor 52 can quickly increase to provide a voltage level equal to that of the control input voltage. With this ability to charge to very nearly the breakdown voltage level of the unijunction transistor 2, the capacitor 52 can provide adequate energy to generate output pulses when the unijunction transistor 2 is fired early in the charging cycle of the capacitor 34.

Figure 3:
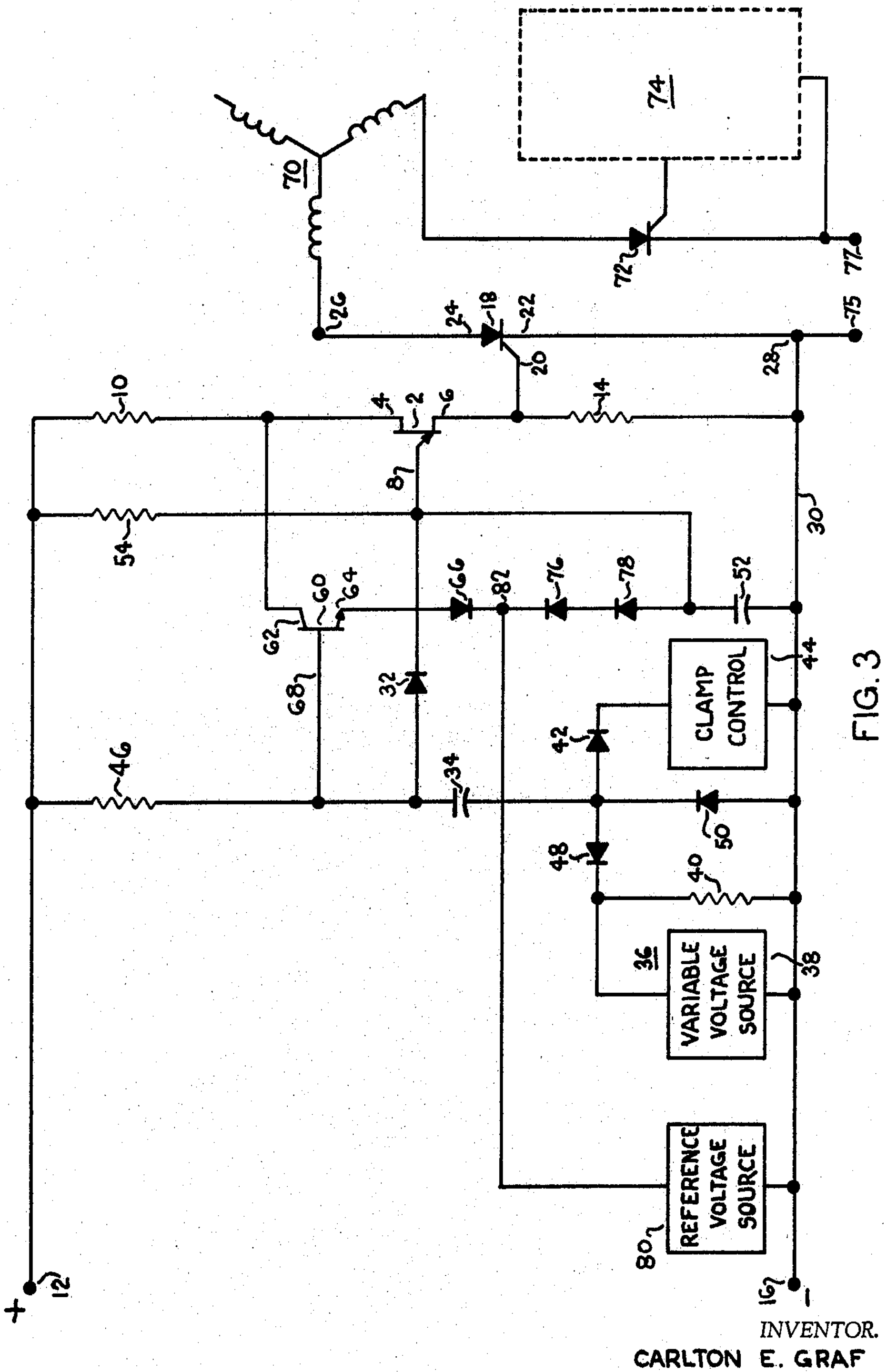
FIG. 3 is a schematic diagram of still another embodiment of this invention wherein a unijunction transistor is fired independently of its breakdown voltage level.

FIG. 3 shows still another embodiment of this invention wherein the unijunction transistor in the time delay control circuit can be fired at a predetermined voltage level independent of the breakdown voltage level of the unijunction transistor. This characteristic of the circuit allows the unijunction transistor to be fired independently of any changes which might occur in its intrinsic stand-off ratio. Furthermore, this characteristic allows a plurality of unijunction transistor control circuits to be used without matching their intrinsic stand-off ratios and without compensating for the effects which ambient temperature changes may have on the characteristics of the unijunction transistors. Circuit components similar to those described with respect to FIGS. 1 and 2 are marked with the same numerals used in those figures.

In FIG. 3, the control circuit is shown as the source of firing voltage for one of a plurality of controlled rectifiers in a rectifier circuit connected to a three-phase source 70. A controlled rectifier 72 is shown connected in a different phase of the source 70 from which the control rectifier 18 is connected. A time delay control circuit 74, which controls the firing of the control rectifier 72, may be similar to that used to control the firing of the controlled rectifier 18. Each phase of the source 70 may have one or more controlled rectifiers with similar time delay control circuits. A load may be connected across the terminals 75 and 77.

In this circuit, the collector electrode 62 of the transistor 60 is connected to the base two electrode 4 of the unijunction transistor 2. The resistor 54 is now connected to the emitter electrode 8 and the capacitor 52 to charge the capacitor 52. Diodes 76 and 78 are connected in series bteween the cathode of the diode 66 and the capacitor 52. A reference voltage source 80 is connected between a junction 82 of the diodes 66 and 76 and the common line 30. The diodes 76 and 78 block the reference voltage from the capacitor 52. The emitter follower transistor 60 compares the control input voltage at its base electrode 68 with the reference voltage level of the reference voltage source 80, connected through its emitter and the diode 66. The capacitor 52 charges to a voltage level equal to the reference voltage level, plus the voltage drop across the diodes 76 and 78.

Where a plurality of time delay control circuits is being used in the same circuit configuration, the variable voltage source 38 and the reference voltage source 80 may be common to each circuit. This synchronizes the changes in the time delay for each of the control circuits.

During the operation of the control circuit shown in FIG. 3, the reference voltage source 80 is maintained at a voltage level below the breakdown voltage level of the unijunction transistor 2. The control input voltage comprises the sum of the variable voltage from the source 38 and the voltage developed across the capacitor 34, as discussed above. The transistor 60 compares the reference voltage level, coupled through the diode 66 to its emitter electrode 64, with the control input voltage level at its base electrode 68. When the control input voltage level reaches the reference voltage level, the transistor 60 conducts, decreasing the base-to-base voltage of the unijunction transistor 2. The control input voltage, now substantially equal to the base-to-base voltage, fires the unijunction transistor 2. The capacitors 34 and 52 discharge through the emitter electrode 8, the base one electrode 6, and the resistor 14 to fire the control rectifier 18.

Thus, in FIG. 3 the unijunction transistor 2 assumes its low impedance state without regard to its intrinsic stand-off ratio. The time constant of the timing circuit which includes the capacitor 34, is constant with changes in temperature. For this reason the time delay between successive output pulses also remains constant with changes in temperature. The characteristics of the unijunction transistor are not used as a substitute for a reference voltage source. Rather, the interdependence of the base-to-base voltage and the emitter-to-base one voltage in firing the unijunction transistor and this transistor's negative impedance characteristics cause output pulse generation once a reference voltage level is reached by a composite of the timing capacitor voltage and the pedestal voltage.

This invention is not limited to the particular details of the preferred embodiments illustrated. It is contemplated that various modifications and applications within the scope of this invention will occur to those skilled in the art. It is therefore intended that the appended claims cover such modifications which do not depart from the direct spirit and scope of this invention.

What I claim as new and desire to secure by Letters Patent of the United States is:

1. A circuit for converting control input signals to time delayed output pulses for application to a load wherein the timing period between successive ouput pulses can be controlled in response to a timing signal and a platform signal having a magnitude which determines precise changes in the timing period between successive output pulses, comprising, in combination:

(a) a unijunction transistor having a base one electrode, a base two electrode and an emitter electrode;

(b) first means adapted to connect said base one and said base two electrodes across an operating voltage source;

(c) second means for providing control input signals for firing said unijunction transistor to form output pulses, said second means including:

(1) first capacitance means;

(2) third means connected to said first capacitance means for charging said capacitance means at a predetermined rate to develop a capacitance timing voltage across said first capacitance means;

(3) a platform voltage source designed to provide a continuous platform voltage which can change the timing period between successive output pulses, the platform voltage being variable in magnitude to precisely determine the timing period; and (4) fourth means for connecting said first capacitance means and said platform voltage source in a series circuit across two of said electrodes, said series circuit being such that said platform voltage source does not charge said first capacitance means and thus the sum of the timing voltage and the platform voltage fires said unijunction transistor when the sum reaches a prescribed firing voltage level.

2. A circuit according to claim 1 including fifth means connected to said fourth means to isolate said platform voltage source from the discharge path of said first capacitance means when said unijunction transistor is fired.

3. A circuit according to claim 2 wherein said fifth means includes a first diode connected between said first capacitance means and said platform voltage source and a second diode connected across said platform voltage source.

4. A circuit according to claim 1 including second capacitance means, sixth means connected to said second capacitance means and adapted to be connected to a power source to charge said second capacitance means to a voltage level less than the firing voltage level of said unijunction transistor and means for connecting said second capacitance means across said emitter and said base one electrode to discharge said second capacitance through said unijunction transistor when said unijunction transistor is fired, thereby providing additional current to bring said unijunction transistor to its low impedance state once it is fired, regardless of the charge across said first capacitance means.

5. A circuit according to claim 1 including an auxiliary energy source for storing energy at a voltage level less than the firing voltage level of said unijunction transistor and seventh means for connecting said auxiliary energy source across said emitter and said base one electrodes, said seventh means conducting current from said auxiliary energy source and through said emitter and said base one electrodes when said unijunction transistor is fired.

6. A circuit according to claim 5 wherein said auxiliary energy source includes second capacitance means and eighth means adapted to be connected to said second capacitance means to charge said second capacitance means at a rate approximately ten times the charging rate of said first capacitance means.

7. A circuit according to claim 1 wherein said fourth means connects said first capacitance means and said platform voltage source in series across said emitter and base one electrodes to fire said unijunction transistor when the control input signal reaches the breakdown voltage level of said unijunction transistor.

8. A circuit according to claim 1 wherein said fourth means connects said first capacitance means and said platform voltage source across said base one and said base two electrodes, said fourth means including means for lowering the base two-to-base one voltage when the control input signal equals the prescribed voltage level, the circuit also including means for connecting said first capacitance means to said emitter electrode so that said first capacitance means is discharged when said unijunction transistor is fired.

9. A circuit for converting control input signals comprising a time variable signal and a direct current signal to time delayed output pulses, comprising, in combination:

(a) a unijunction transistor having a base one electrode, a base two electrode, and an emitter electrode;

(b) first means adapted to connect said base one and said base two electrodes across an operating voltage source;

(c) first capacitance means and second means connected to said first capacitance means for charging it at a known rate to develop a time variable signal;

(d) a variable voltage, direct current source connected to said first capacitance means to provide a direct current signal which changes the timing period between successive output pulses;

(e) a source of reference voltage;

(f) third means having a first terminal, a second terminal, and a third terminal; means for connecting said first terminal to said first capacitance means, means for connecting said second terminal to said source of reference voltage; means for interconnecting said first capacitance means, said variable voltage source, and said source of reference voltage to cause said third means to compare the sum of the time variable signal and the direct current signal with the reference voltage; means for connecting said third terminal to said base two electrode to decrease the base two-to-base one voltage level to fire said unijunction transistor when the sum of the time variable signal and direct current signal equals the reference voltage.

10. A circuit according to claim 9 including fourth means for connecting said first capacitance means to said emitter electrode to apply the control input signals to said emitter electrode and to cause said unijunction transistor to discharge said first capacitance means.

11. A circuit according to claim 9 wherein said third means comprises a transistor having its base electrode connected to said first capacitance means and its emitter electrode connected to said source of reference voltage.

12. A circuit for converting control input signals comprising a time variable signal and a direct current signal to time delayed output pulses for firing a controlled rectifier, comprising, in combination:

(a) a unijunction transistor having a base one electrode, a base two electrode, and an emitter electrode;

(b) first means adapted to connect said base one and said base two electrodes across an operating voltage source;

(c) first capacitance means and second means connected to said first capacitance means for charging it at a known rate to develop a time variable signal;

(d) a variable voltage, direct current source connected in series with said first capacitance means to provide a direct current signal which can change the timing period between successive output pulses without charging said first capacitance means;

(e) third means for connecting said first capacitance means and said direct current source in the emitter-base one electrode circuit of said unijunction transistor to fire said unijunction transistor when the sum of the time variable signal and the direct current signal equals the breakdown voltage level of said unijunction transistor;

(f) second capacitance means and fourth means adapted to connect said second capacitance means to the operating voltage source to charge said second capacitance means at a substantially higher rate than that at which said first capacitance means is charged;

(g) means for connecting said second capacitance means to said emitter electrode to discharge said second capacitance means when said unijunction transistor is fired.

References Cited

UNITED STATES PATENTS

| | | | |
|---|---|---|---|
| 2,082,123 | 6/1937 | Samuel | 328—86 |
| 2,802,117 | 8/1957 | Mathis et al. | 307—301 |
| 3,126,516 | 3/1964 | Peaslee | 307—301 |
| 3,073,966 | 1/1963 | Chrzanowski et al. | 307—301 |
| 3,249,771 | 5/1966 | Pearse et al. | 307—293 |
| 3,378,698 | 4/1968 | Kadah | 307—246 |

DONALD D. FORRBER, Primary Examiner

R. C. WOODBRIDGE, Assistant Examiner

U.S. Cl. X.R.

307—301, 252; 328—72, 86, 129; 331—111